United States Patent
Poirier et al.

(10) Patent No.: US 11,489,214 B2
(45) Date of Patent: Nov. 1, 2022

(54) TEMPERATURE REGULATED CURRENT SHUNTS FOR ELECTRIFIED VEHICLE BATTERY PACKS

(71) Applicant: FORD GLOBAL TECHNOLOGIES, LLC, Dearborn, MI (US)

(72) Inventors: Eric Poirier, Brownstown, MI (US); Daniel Paul Roberts, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 711 days.

(21) Appl. No.: 15/943,940

(22) Filed: Apr. 3, 2018

(65) Prior Publication Data

US 2019/0305389 A1 Oct. 3, 2019

(51) Int. Cl.
| | |
|---|---|
| *H01M 10/613* | (2014.01) |
| *H01M 10/625* | (2014.01) |
| *H01M 10/6554* | (2014.01) |
| *H01M 10/6556* | (2014.01) |
| *H01M 10/6567* | (2014.01) |
| *B60L 58/26* | (2019.01) |
| *B60L 50/64* | (2019.01) |
| *H01M 50/20* | (2021.01) |

(52) U.S. Cl.
CPC .......... *H01M 10/613* (2015.04); *B60L 50/64* (2019.02); *B60L 58/26* (2019.02); *H01M 10/625* (2015.04); *H01M 10/6554* (2015.04); *H01M 10/6556* (2015.04); *H01M 10/6567* (2015.04); *H01M 50/20* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 7,573,274 B2 | 8/2009 | Aratani | |
| 7,772,799 B2 | 8/2010 | Wu | |
| 8,658,299 B2 | 2/2014 | Yang et al. | |
| 2007/0018610 A1* | 1/2007 | Wegner | H01M 2/0212 320/112 |
| 2007/0087266 A1 | 4/2007 | Bourke et al. | |
| 2009/0015206 A1* | 1/2009 | Seman, Jr. | H01M 10/441 320/134 |
| 2011/0206948 A1* | 8/2011 | Asai | H01M 10/6556 429/7 |
| 2014/0113171 A1* | 4/2014 | Schaefer | H01M 2/1077 429/120 |
| 2015/0044518 A1 | 2/2015 | Scheucher | |
| 2018/0299510 A1* | 10/2018 | Park | B60L 58/10 |

OTHER PUBLICATIONS

Day, Lewin, "How Current Shunts Work", www.hackaday.com, Feb. 8, 2018 (Year: 2018).*

* cited by examiner

*Primary Examiner* — Carmen V Lyles-Irving
(74) *Attorney, Agent, or Firm* — David B. Kelley; Carlson, Gaskey & Olds, P.C.

(57) ABSTRACT

This disclosure details exemplary battery pack designs for use in electrified vehicles. An exemplary battery pack may incorporate one or more temperature regulated current shunts for measuring current flow into and out of battery cells of the battery pack. The temperature of the current shunt can be regulated by a liquid cooling system associated with the battery pack.

25 Claims, 6 Drawing Sheets

TEMPERATURE REGULATED CURRENT SHUNTS FOR ELECTRIFIED VEHICLE BATTERY PACKS

TECHNICAL FIELD

This disclosure relates to electrified vehicle battery packs, and more particularly to electrified vehicle battery packs that utilize temperature regulated current shunts for monitoring current flow through battery cells.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. The battery pack includes a plurality of battery cells that store energy for powering these electrical loads. Current sensors are commonly used to measure the amount of current flowing in and out of the battery cells. The current measurements are then used to determine the power supplied or received by the battery cells at any given voltage, and accordingly, can be used to estimate the battery state of charge (SOC). Current measurements are therefore key to the battery packs energy control strategy, which determines driving range and available power in real time. Current sensors are relatively expensive components of the battery pack.

SUMMARY

A battery pack according to an exemplary aspect of the present disclosure includes, among other things, a heat exchanger plate, a battery array positioned against the heat exchanger plate, and a current shunt mounted to either the heat exchanger plate or the battery array.

In a further non-limiting embodiment of the foregoing battery pack, the battery array includes a first grouping of battery cells, and a second battery array is laterally spaced from the battery array and includes a second grouping of battery cells.

In a further non-limiting embodiment of either of the foregoing battery packs, the battery array and the second battery array are both positioned against a top surface of the heat exchanger plate.

In a further non-limiting embodiment of any of the foregoing battery packs, the heat exchanger plate includes a plate body and a coolant circuit having one or more passageways that extend inside the plate body.

In a further non-limiting embodiment of any of the foregoing battery packs, the current shunt is mounted to an upper surface of the heat exchanger plate.

In a further non-limiting embodiment of any of the foregoing battery packs, the current shunt is mounted near an inlet of a coolant circuit of the heat exchanger plate.

In a further non-limiting embodiment of any of the foregoing battery packs, the current shunt includes a first end block, a second end block, and a fin extending between the first end block and the second end block.

In a further non-limiting embodiment of any of the foregoing battery packs, the fin extends between lower inner corners of each of the first end block and the second end block to establish a flat bottom surface of the current shunt. The flat bottom surface sits flush against the heat exchanger plate.

In a further non-limiting embodiment of any of the foregoing battery packs, the fin extends between inner walls of the first end block and the second end block at a location that is between upper inner corners and lower inner corners of the first end block and the second end block, and the heat exchanger plate includes a protrusion that extends between the first end block and the second end block and contacts the fin.

In a further non-limiting embodiment of any of the foregoing battery packs, the battery array includes an end plate having a mounting foot that is received in direct contact with the heat exchanger plate.

In a further non-limiting embodiment of any of the foregoing battery packs, the current shunt is mounted against the mounting foot.

In a further non-limiting embodiment of any of the foregoing battery packs, a control module is configured to measure a voltage across the current shunt and then estimate a current amplitude based on the voltage.

In a further non-limiting embodiment of any of the foregoing battery packs, an electrically insulating thermal interface material is disposed between the current shunt and the heat exchanger plate.

A method according to another exemplary aspect of the present disclosure includes, among other things, regulating a temperature of a current shunt of an electrified vehicle battery pack with a liquid cooling system of the electrified vehicle battery pack.

In a further non-limiting embodiment of the foregoing method, regulating the temperature includes dissipating heat from the current shunt into a heat exchanger plate of the liquid cooling system.

In a further non-limiting embodiment of either of the foregoing methods, regulating the temperature includes dissipating heat from the current shunt into an end plate of a battery array of the electrified vehicle battery pack and then into a heat exchanger plate of the liquid cooling system.

In a further non-limiting embodiment of any of the foregoing methods, the method includes measuring a temperature of the current shunt and determining whether the temperature of the current shunt is within a predefined operational temperature range, or using the temperature to apply temperature correction factors to a response of the current shunt.

In a further non-limiting embodiment of any of the foregoing battery packs, the current shunt is mounted to a heat exchanger plate of the liquid cooling system.

In a further non-limiting embodiment of any of the foregoing battery packs, the current shunt is mounted to a mounting foot of an end plate of a battery array of the electrified vehicle battery pack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. An exemplary battery pack may incorporate one or more temperature regulated current shunts for measuring current flow into and out of battery cells of the battery pack. The temperature of the current shunt can be regulated using a liquid cooling system associated with the battery pack. These and other features are discussed in greater detail in the following paragraphs of this detailed description.

Figure 1:
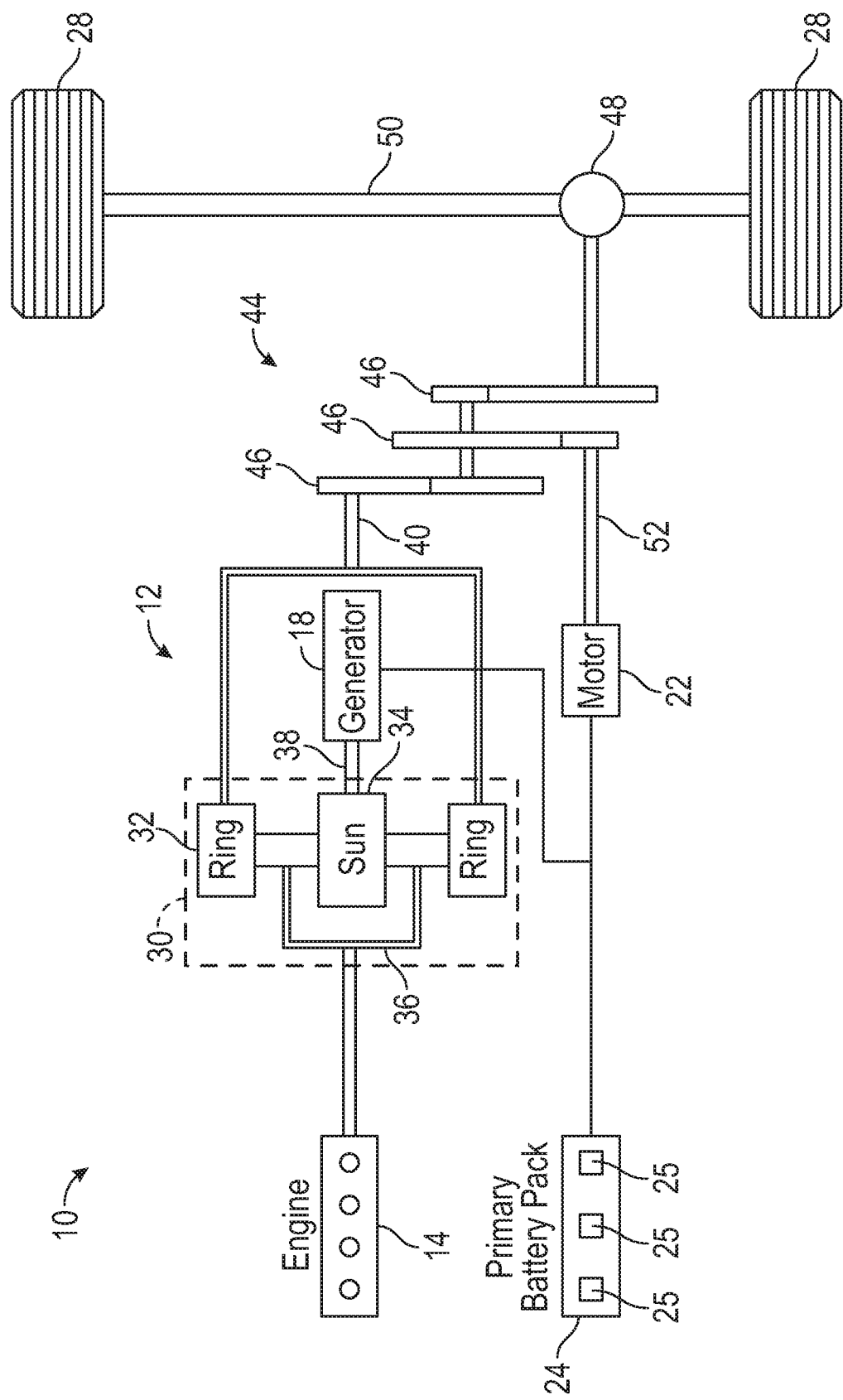
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system may include a combination of an engine 14 and a generator 18 (i.e., a first electric machine). The second drive system may include at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle traction battery. The battery pack 24 may be a high voltage traction battery that includes a plurality of battery arrays 25 (i.e., battery assemblies or groupings of battery cells) capable of outputting electrical power to operate the motor 22 and/or other electrical loads of the electrified vehicle 12 and are capable of receiving power from the generator 18. Other types of energy storage devices and/or output devices could also be used to electrically power the electrified vehicle 12, including low voltage batteries.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
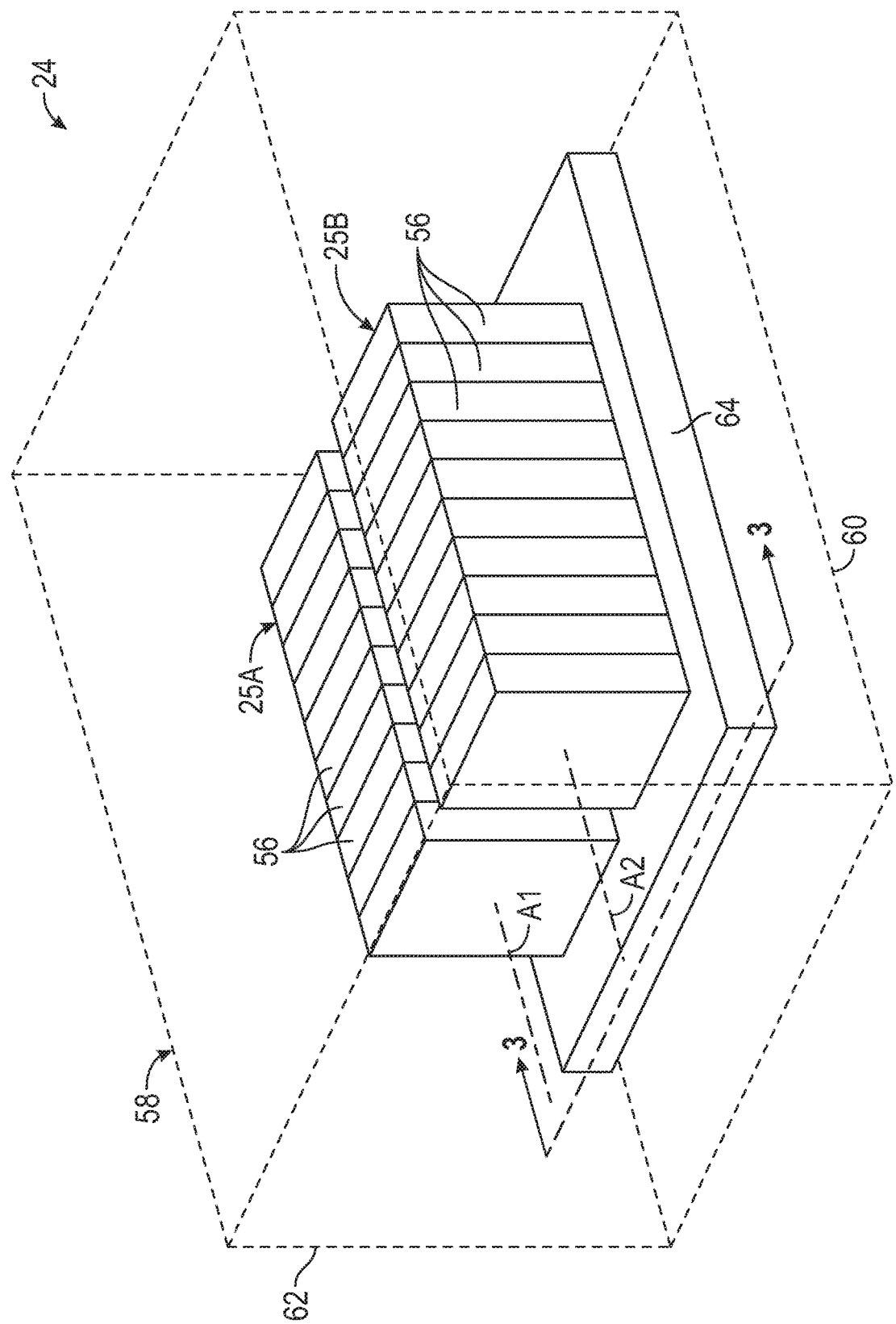
FIG. 2 illustrates a battery pack of an electrified vehicle according to an embodiment of this disclosure.

FIG. 2 is a highly schematic depiction of a battery pack 24 that can be employed within an electrified vehicle. For example, the battery pack 24 could be part of the powertrain 10 of the electrified vehicle 12 of FIG. 1. FIG. 2 is a perspective view of the battery pack 24, and some external components (e.g., an enclosure assembly 58) are shown in phantom to better illustrate the internal components of the battery pack 24.

The battery pack 24 houses a plurality of battery cells 56 that store energy for powering various electrical loads of the electrified vehicle 12. The battery pack 24 could employ any number of battery cells within the scope of this disclosure. Thus, this disclosure is not limited to the exact configuration shown in FIG. 2.

The battery cells 56 may be stacked side-by-side to construct a grouping of battery cells 56, sometimes referred to as a "cell stack" or "cell array." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery array. The battery pack 24 depicted in FIG. 2 includes a first battery array 25A and a second battery array 25B that is positioned side-by-side with the first battery array 25A. Although the battery pack 24 of FIG. 2 is depicted as having a two battery arrays, the battery pack 24 could include a greater or fewer number of battery arrays within the scope of this disclosure.

The battery cells 56 of the first battery array 25A are distributed along a first longitudinal axis A1, and the battery cells 56 of the second battery array 25B are distributed along a second longitudinal axis A2. In an embodiment, the first longitudinal axis A1 is laterally spaced from the second longitudinal axis A2. The first and second battery arrays 25A, 25B are therefore positioned side-by-side relative to one another in this embodiment.

An enclosure assembly 58 houses each battery array 25A, 25B of the battery pack 24. In an embodiment, the enclosure assembly 58 is a sealed enclosure that includes a tray 60 and a cover 62 that is secured to the tray 60 to enclose and seal each battery array 25A, 25B of the battery pack 24. In another embodiment, the first and second battery arrays 25A, 25B are both positioned on top of the tray 60 of the enclosure assembly 58, and the cover 62 may be received over the first and second battery arrays 25A, 25B. The enclosure assembly 58 may include any size, shape, and configuration within the scope of this disclosure.

Each battery array 25A, 25B of the battery pack 24 may be positioned relative to a heat exchanger plate 64, sometimes referred to as a cold plate, such that the battery cells 56 are either in direct contact with or in close proximity to the heat exchanger plate 64. In an embodiment, the battery arrays 25A, 25B share a common heat exchanger plate 64. However, the battery pack 24 could employ multiple heat exchanger plates within the scope of this disclosure.

The heat exchanger plate 64 may be part of a liquid cooling system that is associated with the battery pack 24 and is configured for thermally managing the battery cells 56 of each battery array 25A, 25B. For example, heat may be generated and released by the battery cells 56 during charging operations, discharging operations, extreme ambient conditions, or other conditions. It may be desirable to remove the heat from the battery pack 24 to improve capacity, life, and performance of the battery cells 56. The heat exchanger plate 64 is configured to conduct the heat out of the battery cells 56. In other words, the heat exchanger plate 64 acts as a heat sink to remove heat from the heat sources (i.e., the battery cells 56). The heat exchanger plate 64 could alternatively be employed to heat the battery cells 56, such as during extremely cold ambient conditions, for example.

Figure 3:
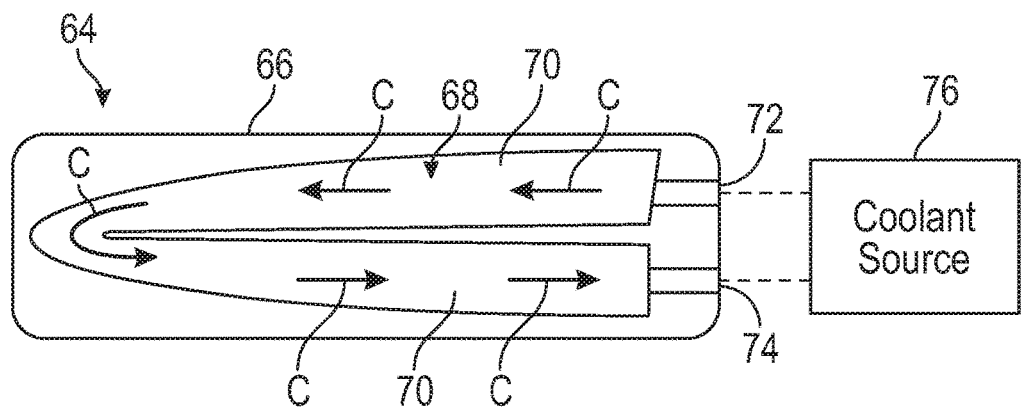
FIG. 3 is a cross-sectional view through section 3-3 of FIG. 2.

Referring to FIG. 3, the heat exchanger plate 64 may include a plate body 66 and a coolant circuit 68 formed inside the plate body 66. The coolant circuit 68 may include one or more passageways 70 that extend inside the plate body 66. In an embodiment, the passageways 70 are configured to establish a meandering path of the coolant circuit 68.

A coolant C may be selectively circulated through the passageways 70 of the coolant circuit 68 to thermally condition the battery cells 56 of the battery pack 24. The coolant C may enter the coolant circuit 68 through an inlet 72 and may exit from the coolant circuit 68 through an outlet 74. The inlet 72 and the outlet 74 may be in fluid communication with a coolant source 76. The coolant source 76 could be part of a main cooling system of the electrified vehicle 12 or could be a dedicated coolant source of the battery pack 24. Although not shown, the coolant C may pass through a heat exchanger before entering the inlet 72.

In an embodiment, the coolant C is a conventional type of coolant mixture, such as water mixed with ethylene glycol. However, other coolants, including gases, are also contemplated within the scope of this disclosure. In use, heat from the battery cells 56 is conducted into the plate body 66 and then into the coolant C as the coolant C is communicated through the coolant circuit 68. The heat may therefore be carried away from the battery cells 56 via the coolant C.

In an embodiment, the plate body 66 of the heat exchanger plate 64 is an extruded part. In another embodiment, the plate body 66 is made of aluminum. However, other manufacturing techniques and materials are also contemplated within the scope of this disclosure for constructing the plate body 66.

Figure 4:
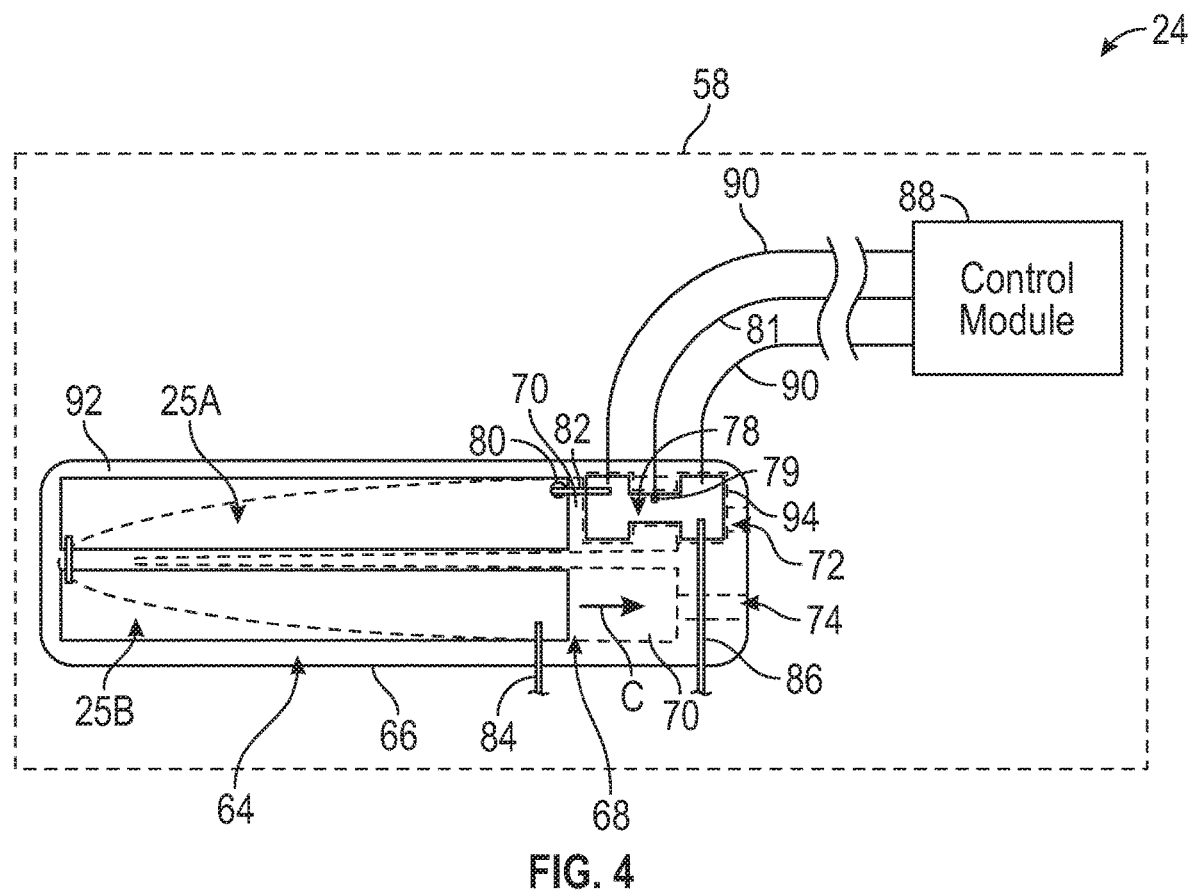
FIG. 4 is a top view of the battery pack of FIG. 2.

FIG. 4 illustrates additional features of the battery pack 24. The battery pack 24 may include one or more current shunts 78 that are configured for measuring the amount of current flowing in and out of the battery cells 56 of the battery arrays 25A, 25B. The current shunt(s) 78 is a high current resistance element with a known resistance. When installed in series with a current carrying component (e.g., the battery arrays 25A, 25B), the difference in voltage across the current shunt 78 when current circulates can be used to calculate the current amplitude (via Ohm's Law).

In an embodiment, the current shunt 78 is electrically connected in series to an output terminal 80 of the battery array 25A by a first wire 82. In addition, the battery array 25B and the current shunt 78 may be electrically connected to a high voltage load (e.g., an electric motor) via a second wire 84 and a third wire 86, respectively. The first wire 82, the second wire 84, and the third wire 86 are high voltage wires, in an embodiment. Busbars could also be utilized.

The current shunt 78 may be electrically coupled to a control module 88, such as a battery energy control module (BECM), via sense leads 90. The response of the current shunt 78 depends on the current flowing through it and is generally established by the manufacturer in mV/A (e.g., 100 mV/1000 A). The voltage across the current shunt 78 may be fed to the control module 88. Using a conversion factor (e.g. mV/A) or conversion tables (e.g., mV/A as a function of temperature), the voltage characteristics may be converted into a current amplitude in Amperes. In an embodiment, the voltage across the current shunt 78 is locally amplified (e.g., using an operational amplifier) and then measured by the control module 88 for improving the signal to noise ratio. The current measurements may then be utilized as part of the battery pack control strategy, such as for monitoring the state-of-charge (SOC) of the battery pack 24 via current integration, driving range, available power, etc.

The resistance of the current shunt 78 is dependent on temperature, and therefore the current response of the current shunt 78 can fluctuate based on temperature deviations under varying loads. In order to address this, the current shunt 78 may be installed on a surface of the plate body 66 of the heat exchanger plate 64 in order to maintain the current shunt 78 within a predefined operational temperature range for maximizing its current measurement accuracy. During use, for example, heat from the current shunt 78 may be conducted into the plate body 66 of the heat exchanger plate 64 and then into the coolant C as the coolant C is communicated through the coolant circuit 68. The heat is therefore dissipated away from the current shunt 78 within the coolant C.

In an embodiment, the current shunt 78 is mounted in direct contact with an upper surface 92 of the plate body 66 of the heat exchanger plate 64. The upper surface 92 may be the surface upon which the battery arrays 25A, 25B are also positioned. However, the current shunt 78 and the battery arrays 25A, 25B could be positioned against any surface of the plate body 66.

The current shunt 78 may be located at a relatively cold location of the heat exchanger plate 64. In an embodiment, the current shunt 78 is positioned on the plate body 66 at a location that is near the inlet 72 of the coolant circuit 68.

A thermal interface material (TIM) 94 may optionally be positioned between the current shunt 78 and the heat exchanger plate 64. The TIM 94 maintains thermal contact between the current shunt 78 and the heat exchanger plate 64 and increases the thermal conductivity between these neighboring components during heat transfer events. The TIM 94 may also provide electrical insulation for preventing the heat exchanger plate 64 from experiencing the same voltage as that passed through the current shunt 78. The TIM 94 may be made of any known thermally conductive material. Although not specifically shown, a TIM could also extend between the battery arrays 25A, 25B and the heat exchanger plate 64.

The liquid cooling system of the battery pack 24 may additionally include one or more temperature sensors 79. In an embodiment, the temperature sensor 79 is mounted to the current shunt 78. However, other mounting locations are also contemplated within the scope of this disclosure. The temperature sensor 79 may be electrically coupled to the control module 88 via a sense lead 81. The temperature sensor 79 may be used to confirm that the current shunt 78 is operating within its designed temperature range, or alternatively, to apply temperature correction factors to the current shunt 78 response for improved accuracy.

Figure 5:
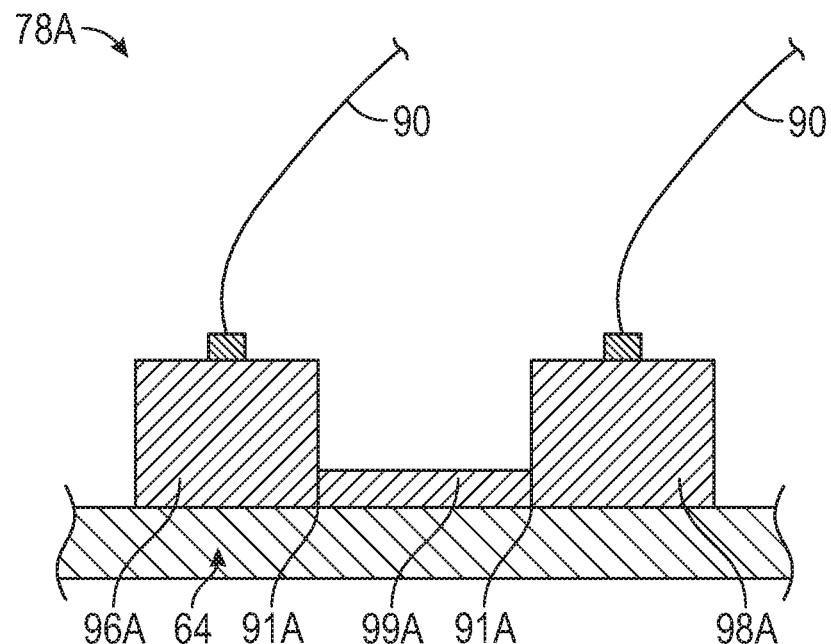
FIG. 5 illustrates a temperature regulated current shunt for a battery pack according to a first embodiment of this disclosure.

FIG. 5 illustrates an exemplary current shunt 78A. The current shunt 78A may include a first end block 96A, a second end block 98A, and a fin 99A extending between the first and second end blocks 96A, 98A. In an embodiment, the first end block 96A and the second end block 98A are conductive elements of the current shunt 78A that are made of a conductive material (e.g., copper, aluminum, etc.), and the fin 99A is a resistive element of the current shunt 78A that is made of a resistive material (e.g., Manganin).

The fin 99A may extend between lower inner corners 91A of each of the first end block 96A and the second end block 98A to establish a flat bottom surface of the current shunt 78A. In this configuration, each of the first end block 96A, the second end block 98A, and the fin 99A can be positioned flush with the heat exchanger plate 64.

Figure 6:
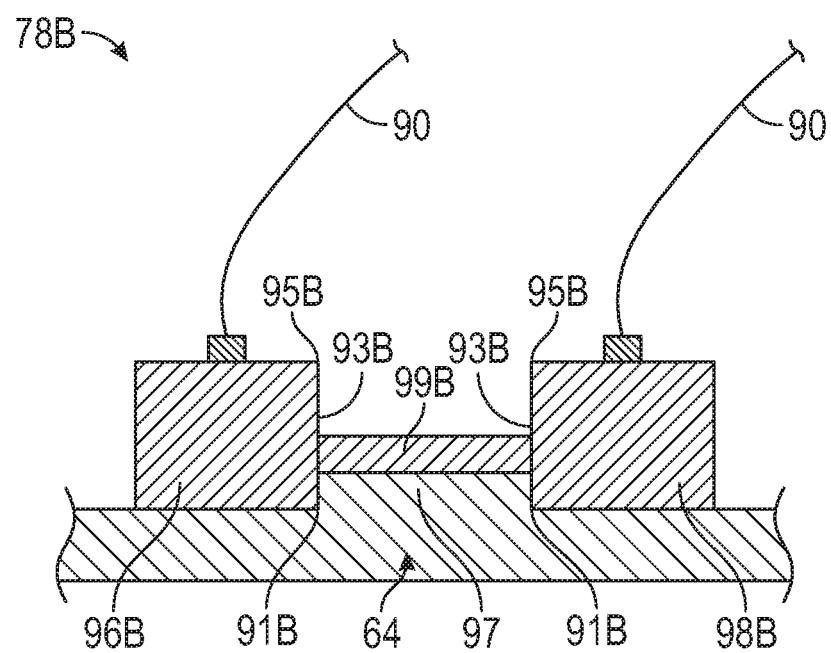
FIG. 6 illustrates a temperature regulated current shunt for a battery pack according to a second embodiment of this disclosure.

FIG. 6 illustrates another exemplary current shunt 78B. The current shunt 78B may include a first end block 96B, a second end block 98B, and a fin 99B extending between the first and second end blocks 96B, 98B. In an embodiment, the first end block 96B and the second end block 98B are conductive elements of the current shunt 78B that are made of a conductive material (e.g., copper, aluminum, etc.), and the fin 99B is a resistive element of the current shunt 78B that is made of a resistive material (e.g., Manganin).

The fin 99B may extend between inner walls 93B of the first and second end block 96B, 98B at a location that is between upper inner corners 95B and lower inner corners 91B such that the fin 99B is spaced away from the lower inner corners 91B. In this configuration, the heat exchanger plate 64 may include a protrusion 97 that extends between the first and second end blocks 96B, 98B and contacts the fin 99B when the current shunt 78B is moved against a surface of the heat exchanger plate 64.

Figure 7:
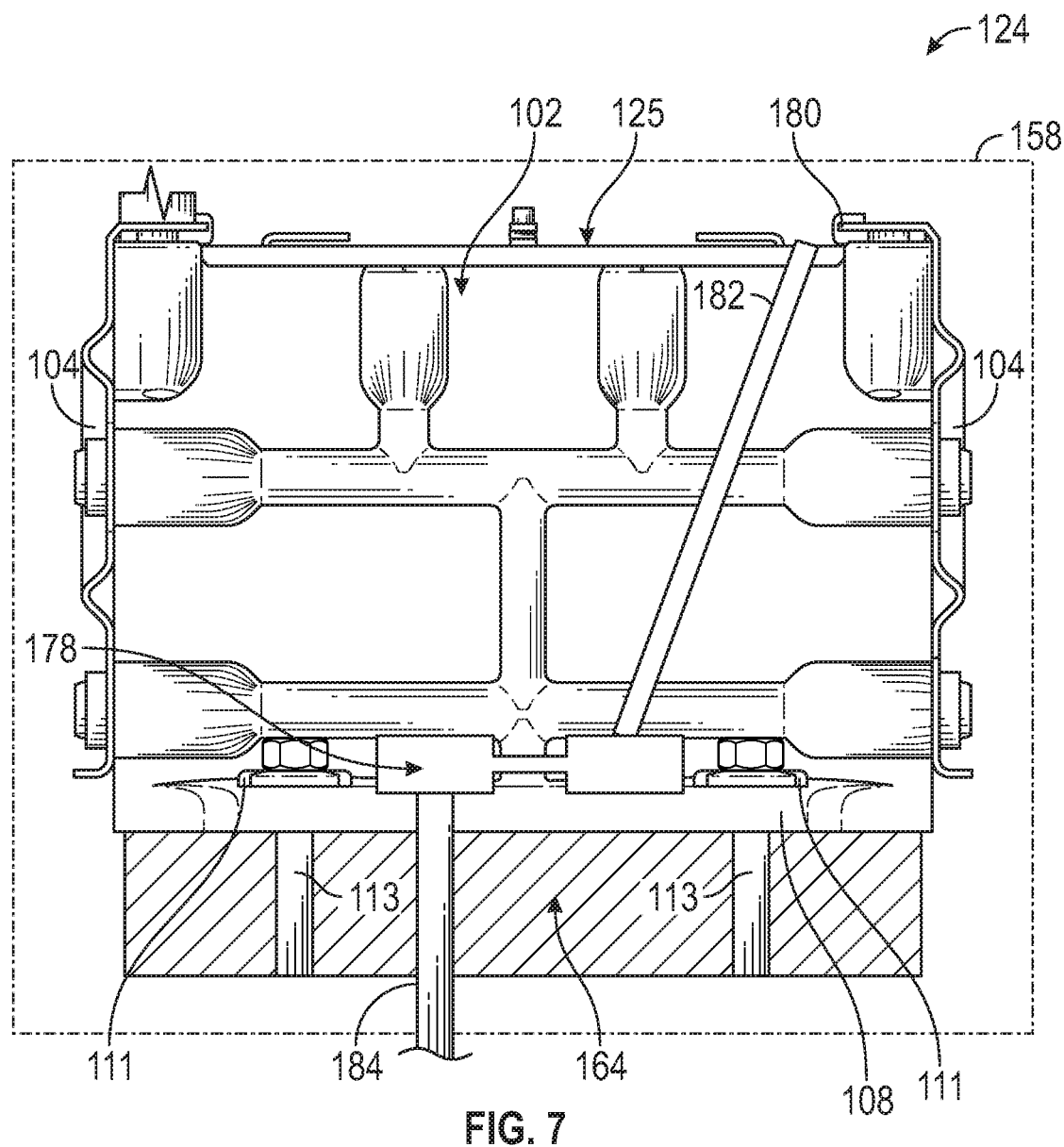
FIG. 7 illustrates a battery pack of an electrified vehicle according to another embodiment of this disclosure.

FIG. 7 illustrates another exemplary battery pack 124 that can be employed for use within the electrified vehicle 12 of FIG. 1. The battery pack 124 may include one or more battery arrays 125, a heat exchanger plate 164, and a current shunt 178 that are each housed inside an enclosure assembly 158.

Figure 8:
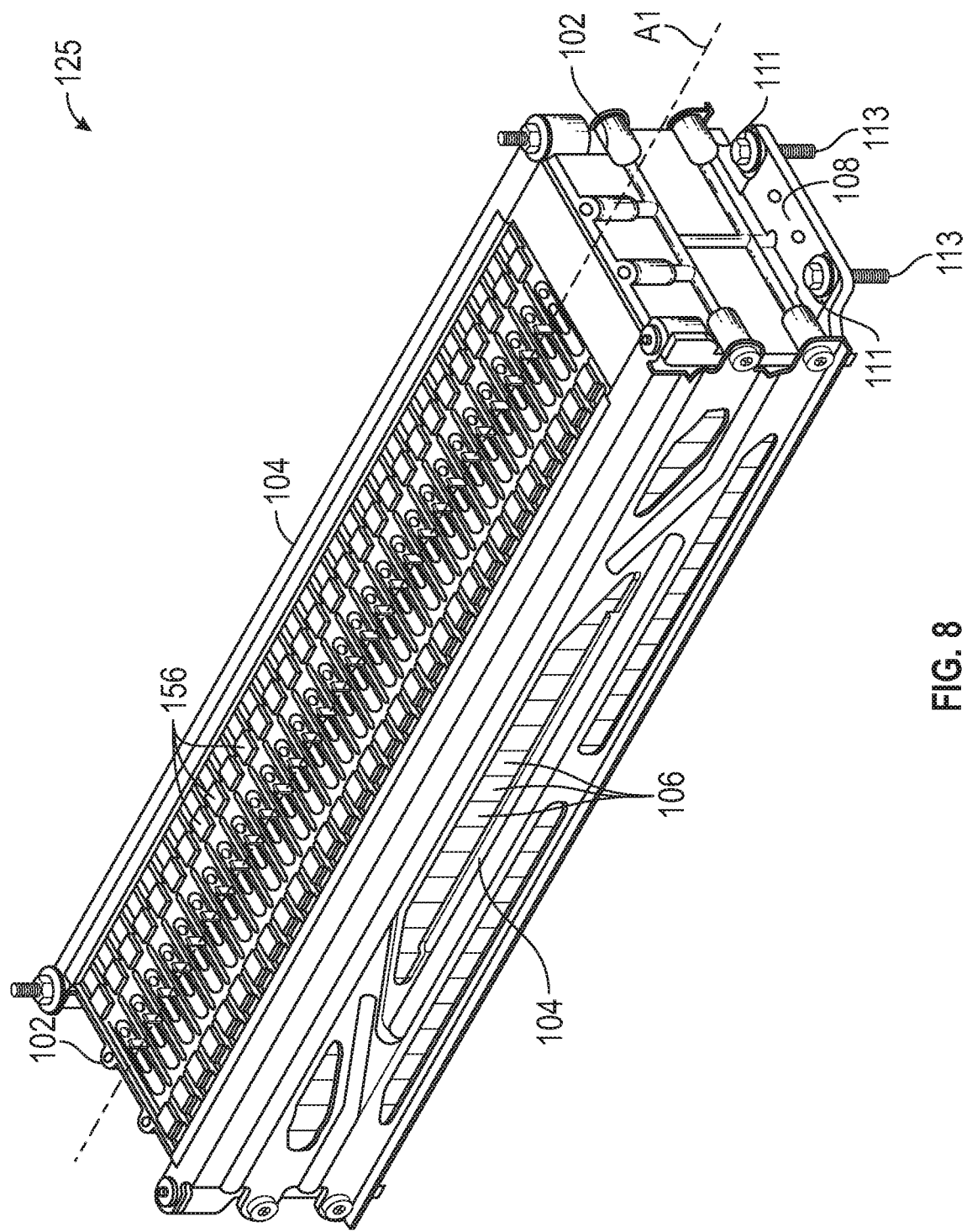
FIG. 8 illustrate a battery array of the battery pack of FIG. 7.

Referring to FIGS. 7 and 8, the battery array 125 may include a plurality of battery cells 156 stacked side-by-side along a longitudinal axis A1. The battery cells 156 may be stacked between opposing end plates 102, which are positioned at the longitudinal ends of the battery array 125, and between opposing side plates 104, which extend along the lateral sides of the battery array 125. The side plates 104 may extend along end faces 106 of each of the plurality of battery cells 156, whereas the end plates 102 extend proximate to only those battery cells 156 that are positioned at the longitudinal extents of the cells stack.

The battery array 125 may be positioned atop the heat exchanger plate 164. The heat exchanger plate 164 may be part of a liquid cooling system associated with the battery pack 124 and that is configured for thermally managing the battery cells 156 of the battery array 125. The heat exchanger plate 164 is configured to conduct the heat out of the battery cells 156 by acting as a heat sink to remove heat from the heat sources (i.e., the battery cells 156).

In an embodiment, each end plate 102 includes a mounting foot 108. The mounting foot 108 may protrude outwardly from the end plate 102 and include openings 111 for receiving fasteners 113. The fasteners 113 may be inserted through the openings 111 to mount the battery array 125 to the heat exchanger plate 164.

The current shunt 178 may be electrically connected in series to an output terminal 180 of the battery array 125 by a busbar 182 or a high voltage wire such as shown in FIG. 4. In addition, the current shunt 178 may be electrically connected to a high voltage load (e.g., an electric motor) via a second busbar 184.

The current shunt 178 may be installed on a surface of the battery array 125 in order to maintain the current shunt 178 within a predefined operational temperature range for maximizing its current measurement accuracy. In an embodiment, the current shunt 178 is mounted to the mounting foot 108 of one of the end plates 102 of the battery array 125. The mounting foot 108 is in direct contact with the heat exchanger plate 164. Therefore, during use, heat from the current shunt 178 may be transferred into the mounting foot 108 and then into the heat exchanger plate 164 for dissipating the heat away from the current shunt 178.

The electrified vehicle battery pack designs of this disclosure incorporate temperature regulated current shunts which may be used in conjunction with battery pack liquid cooling systems to maintain the current shunts within a narrow temperature window where accuracy can be warranted. Use of temperature regulated currents shunts provides for material mass and cost reductions by allowing the use of smaller and lower cost current shunts over an appropriate temperature range. More specifically, as a result of the temperature regulation, a smaller current shunt can be used while maintaining a lower circuit resistance. Accuracy is also improved when compared to standard shunts and magnetic field type current sensors. These advantages are achieved without implementing major battery pack design changes and without compromising the overall battery control strategy.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
a heat exchanger plate;
a battery array positioned against the heat exchanger plate; and
a current shunt mounted directly to the heat exchanger plate or the battery array.

2. The battery pack as recited in claim 1, wherein the battery array includes a first grouping of battery cells, and comprising a second battery array laterally spaced from the battery array and including a second grouping of battery cells.

3. The battery pack as recited in claim 2, wherein the battery array and the second battery array are both positioned against a top surface of the heat exchanger plate.

4. The battery pack as recited in claim 1, wherein the heat exchanger plate includes a plate body and a coolant circuit having one or more passageways that extend inside the plate body.

5. The battery pack as recited in claim 1, wherein the current shunt is mounted directly to an upper surface of the heat exchanger plate.

6. The battery pack as recited in claim 1, wherein the current shunt is mounted near an inlet of a coolant circuit of the heat exchanger plate.

7. The battery pack as recited in claim 1, wherein the current shunt includes a first end block, a second end block, and a fin extending between the first end block and the second end block.

8. The battery pack as recited in claim 7, wherein the fin extends between lower inner corners of each of the first end block and the second end block to establish a flat bottom surface of the current shunt, wherein the flat bottom surface sits flush against the heat exchanger plate.

9. The battery pack as recited in claim 7, wherein the fin extends between inner walls of the first end block and the second end block at a location that is between upper inner corners and lower inner corners of the first end block and the second end block, and the heat exchanger plate includes a protrusion that extends between the first end block and the second end block and contacts the fin.

10. The battery pack as recited in claim 1, wherein the battery array includes an end plate having a mounting foot that is received in direct contact with the heat exchanger plate.

11. The battery pack as recited in claim 10, wherein the current shunt is mounted directly against the mounting foot.

12. The battery pack as recited in claim 1, comprising a control module configured to measure a voltage across the current shunt and then estimate a current amplitude based on the voltage.

13. The battery pack as recited in claim 1, comprising an electrically insulating thermal interface material disposed between the current shunt and the heat exchanger plate.

14. A method, comprising:
regulating a temperature of the current shunt of the battery pack of claim 1 with a liquid cooling system of the battery pack.

15. The method as recited in claim 14, wherein regulating the temperature includes:
dissipating heat from the current shunt into a heat exchanger plate of the liquid cooling system.

16. The method as recited in claim 14, wherein regulating the temperature includes:
dissipating heat from the current shunt into an end plate of a battery array of the electrified vehicle battery pack and then into a heat exchanger plate of the liquid cooling system.

17. The method as recited in claim 14, comprising:
measuring a temperature of the current shunt; and
determining whether the temperature of the current shunt is within a predefined operational temperature range; or
using the temperature to apply temperature correction factors to a response of the current shunt.

18. The method as recited in claim 14, wherein the current shunt is mounted to a heat exchanger plate of the liquid cooling system.

19. The method as recited in claim 14, wherein the current shunt is mounted to a mounting foot of an end plate of a battery array of the battery pack.

20. The battery pack as recited in claim 1, wherein the current shunt is mounted exterior to an interior of any battery cell of a plurality of battery cells of the battery array and is configured to measure an amount of current flowing in and out of the plurality of battery cells.

21. The battery pack as recited in claim 1, comprising a temperature sensor mounted to the current shunt.

22. The battery pack as recited in claim 21, comprising a first sense lead connecting the temperature sensor to a control module of the battery pack, a second sense lead connecting a first conductive element of the current shunt to the control module, and a third sense lead connecting a second conductive element of the current shunt to the control module.

23. The battery pack as recited in claim 7, wherein the first end block and the second end block of the current shunt are conductive elements made of a conductive material, and the fin of the current shunt is a resistive element made of a resistive material that extends from the first end block to the second end block of the current shunt.

24. A battery pack, comprising:
a heat exchanger plate;
a battery array positioned relative to the heat exchanger plate,
wherein the battery array includes a plurality of battery cells and an output terminal;
a current shunt mounted directly to an exterior surface of the heat exchanger plate,
wherein the current shunt includes a first conductive element, a second conductive element, and a resistive element and is configured to measure an amount of current flowing in and out of the plurality of battery cells; and
a wire or a busbar connecting the current shunt to the output terminal.

25. A battery pack, comprising:
a heat exchanger plate;
a battery array positioned relative to the heat exchanger plate,
wherein the battery array includes a grouping of battery cells disposed between a first end plate and a second end plate;
a current shunt mounted directly to either the first end plate or the second end plate of the battery array,
wherein the current shunt includes a first conductive element, a second conductive element, and a resistive element and is configured to measure an amount of current flowing in and out of the grouping of battery cells; and
a wire or a busbar connecting the current shunt to an output terminal of the battery array.

* * * * *